INVENTOR.
JERRY BERG
BY
Ervin B. Steinberg

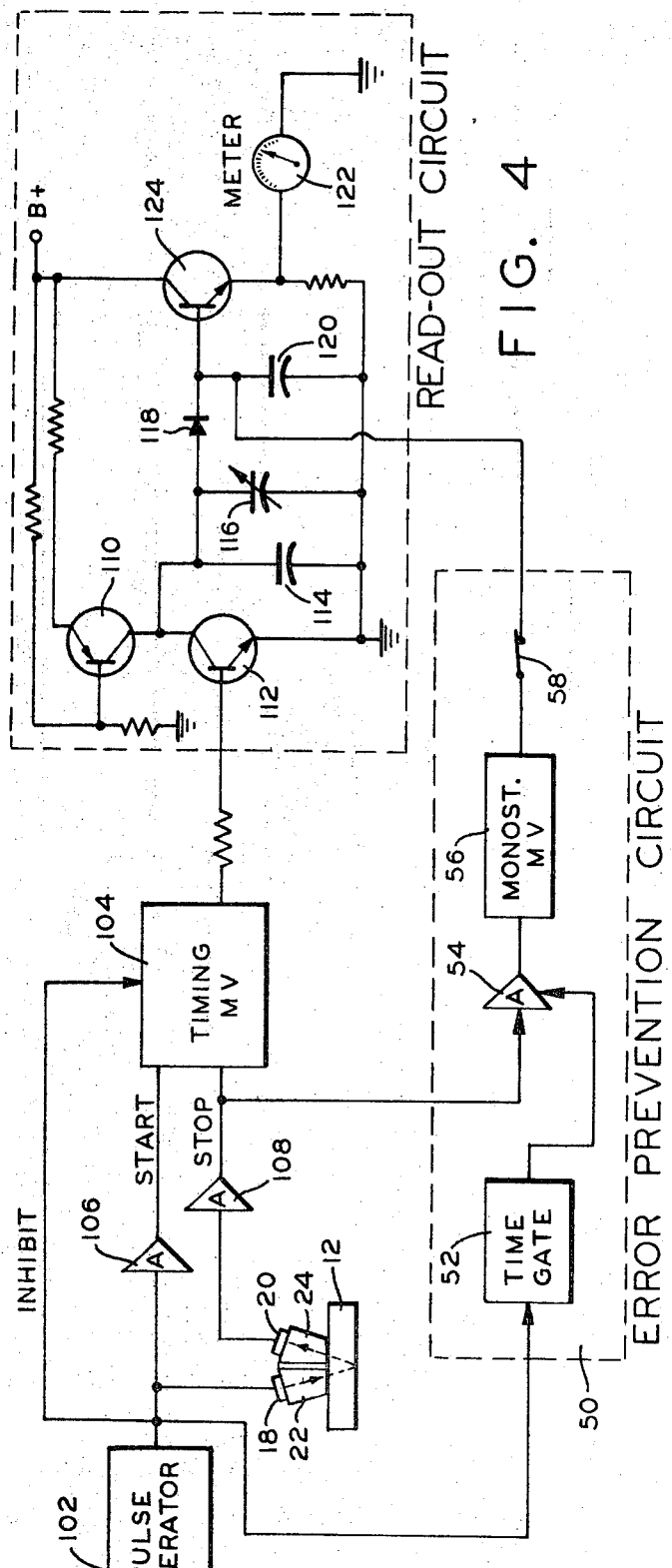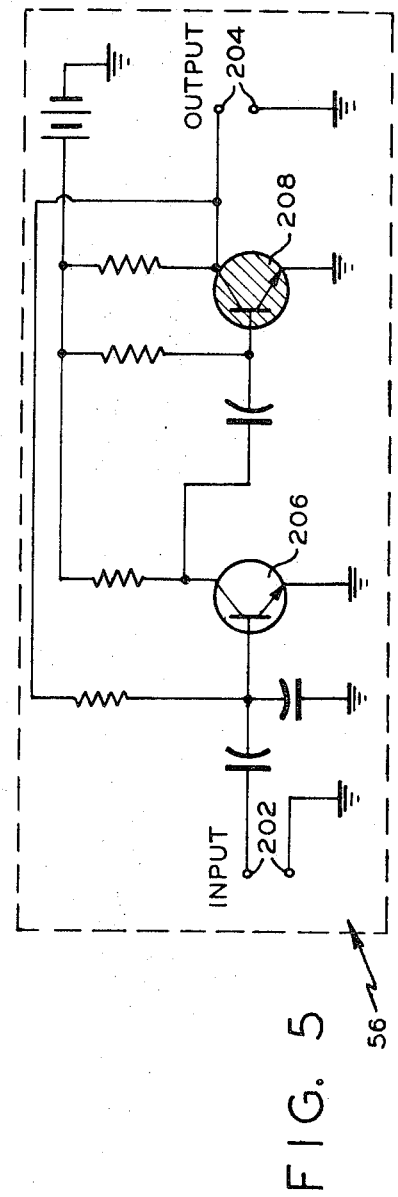

United States Patent Office 3,554,013
Patented Jan. 12, 1971

3,554,013
PULSE-ECHO ULTRASONIC THICKNESS GAUGE WITH ERROR PREVENTION CIRCUIT
Jerry Berg, Stamford, Conn., assignor to Branson Instruments Incorporated, Stamford, Conn., a corporation of Delaware
Filed July 22, 1969, Ser. No. 843,539
Int. Cl. G01n 29/00
U.S. Cl. 73—67.7                                    15 Claims

ABSTRACT OF THE DISCLOSURE

A pulse-echo ultrasonic thickness gauge for a workpiece measures the time interval between the sending of an ultrasonic search pulse and the receipt of a rear surface responsive echo pulse. A special circuit is provided for analyzing the amplitude of the echo pulse to determine whether such echo pulse is caused by a single or multiple reflection of acoustic energy within the workpiece. If the condition of multiple reflection exists, the indication of thickness is suppressed.

---

This invention refers to pulse-echo ultrasonic contact thickness gauging and, more specifically, concerns the provision of an error prevention circuit for a thickness gauge using a meter for displaying the thickness of a workpiece in units of inch or millimeter.

The use of ultrasonic thickness gauging by the pulse-echo ultrasonic test method is well known. An electrical pulse generator provides a pulse at an ultrasonic frequency which is applied to an electro-acoustic transducer. The transducer transforms the electrical pulse to acoustic energy and transmits the ultrasonic signal as a search signal into the entrant surface of a workpiece to be gauged, the transducer being in contact with such surface. As the search signal traverses the thickness of the workpiece and encounters the rear surface, a reflection is caused which manifests itself as an echo signal at the transducer. The time interval between the transmittal of the search signal and the reception of the echo signal is a measure of the thickness of the workpiece. This time interval can be displayed on a cathode ray tube, but, more conveniently in thickness testing, an electronic circuit is used to provide an electrical voltage proportional to the stated time interval, and this voltage is displayed on a meter having a scale calibrated in units of thickness.

For reasons well understood by those skilled in the art, in many thickness testing applications, especially when making corrosion surveys, it is necessary to use a dual transducer probe. This probe is a two-section transducer having in side-by-side relation a transmitter transducer and a receiver transducer. The transmitter transducer is used to send out the search signal while the receiver transducer is used for receiving the echo signal. The probe usually includes time delay means, a section of synthetic thermoplastic material, for providing signal resolution between the search signal and the echo signal. The coupling means serves also to provide a thermal barrier between a hot workpiece surface and the heat-sensitive transducer material (piezoelectric element) forming the heart of the transducer probe. Moreover, particularly for corrosion surveys, the probe is constructed so that the ultrasonic energy beam axis of the transmitter section intersects the beam axis of the receiver section at a location rearward of the entrant surface of the workpiece. Probes of this type are known also as those having angled or focussed beams.

Transducer probes of the latter type, on account of their angled beam construction, have certain measurement ranges within which a particular probe is useable. For instance, a probe designed to have intersecting beam axes at a distance of 0.300 inch rearward of the entrant surface of a workpiece, would not readily be useable on a workpiece having a nominal thickness of 3 inches and vice versa.

The use of a transducer probe of improper range can lead to serious problems. Typically, when measuring workpieces having a thin wall thickness and using a dual transducer probe which is unable to provide a proper measurement within that range, a thickness is indicated which is greater than that actually existing. This phenomenon is caused by a multiple reflection of the ultrasonic beam within the workpiece before reception by the receiver transducer. The present disclosure addresses itself to this problem and provides a means for excluding from the measurement erroneous readings which are based on multiple reflections of the ultrasonic echo signal within the workpiece. Thickness readings of this kind not only are clearly erroneous, but can have serious consequences in critical applications.

One of the principal objects of this invention is, therefore, the provision of a new and improved pulse-echo ultrasonic thickness gauging apparatus.

Another important object of this invention is the provision of a pulse-echo ultrasonic thickness test apparatus provided with means to prevent erroneous readings, particularly readings indicating a thickness greater than that actually existing.

A further important object of this invention is the provision of an ultrasonic thickness gauge based on the pulse-echo principle, and including circuit means for preventing readings which are misleading by being based on multiple reflections of the echo responsive signal within the workpiece.

Further and still other objects of this invention will be more clearly apparent by reference to the following description when taken in conjunction with the accompanying drawings in which:

FIG. 4 is a schematic electrical circuit diagram similar to FIG. 3, but showing an alternative embodiment of a thickness gauge, and FIG. 5 is an electrical circuit diagram of a monostable multivibrator used in conjunction with FIGS. 3 and 4.

Figure 1:
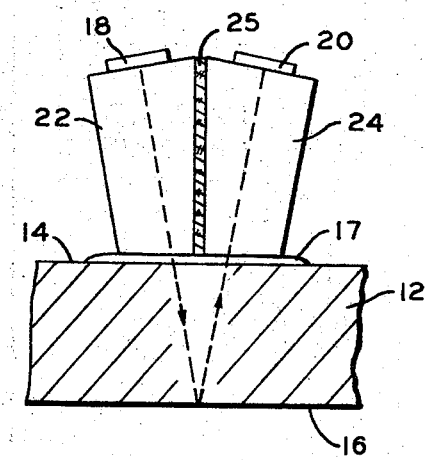
FIG. 1 is a schematic illustration of a dual transducer probe in contact with a workpiece.

Referring now to the figures, and FIG. 1 in particular, a dual transducer probe for pulse-echo testing is shown, the probe being applied to a workpiece 12 which has an entrant surface 14 and a rear surface 16. The main elements of the probe are a transmitting portion comprising a piezoelectric element 18 coupled to a solid coupling means 22, such as a piece of synthetic thermoplastic material, and a signal receiving portion comprising a piezoelectric transducer material 20 and a similar coupling means 24. In order to prevent cross-coupling of acoustic signals traversing the respective sections, a thin layer of separator material 25, such as cork or other sound absorbing material, is disposed between the two portions. Moreover, the transducer probe, as is well known to those skilled in the art, is coupled to the entrant surface 14 of the workpiece 12 by means of a thin couplant film 17, such as water, oil, glycerin, silicon grease, etc. Both portions of the transducer probe are usually enclosed in a common housing as is shown for instance in the book, "Ultrasonic Engineering," by Julian R. Frederick, published by John Wiley & Sons, Inc., New York, 1965, FIG. 7.18 on page 263, or in U.S. Pat. No. 3,325,781 issued to to R. V. Harris, entitled "Dual Transducer Probe for Ultrasonic Testing," dated June 13, 1967.

Still referring to FIG. 1, when an electrical pulse signal of ultrasonic frequency is applied to the transmit transducer 18, the transducer converts the electrical signal applied to an ultrasonic signal which is sent from the transducer through the coupling means 22 and the couplant film 17 into the entrant surface 14 of the workpiece 12 and is propagated within the workpiece. As the search signal encounters the rear surface 16 of the workpiece, the change in acoustic impedance causes a reflection signal and the resulting energy is sent through the workpiece 12, couplant film 17 and coupling means 24 to be sensed as an echo signal by the receive transducer 20. The dual transducer probe is so constructed that the axes of the acoustic energy beams through the transmitting portion and through the receiving portion are inclined with respect to each other and intersect at a point rearward of the entrant surface 14 and adjacent the rear surface 16 of the workpiece 12. Depending on the beam axis angle, a particular transducer is useable for a certain measuring range and the thickness of the workpiece may vary within specified limits. For instance, a particular transducer may provide a measuring range for workpieces varying from 1 inch to 3 inch thickness.

Figure 2:
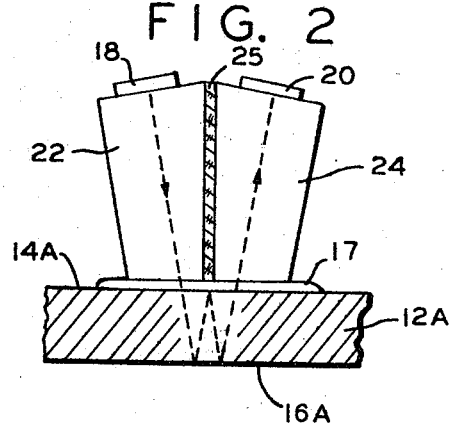
FIG. 2 is a schematic illustration similar to FIG. 1, but the same transducer probe being applied to a thinner workpiece and illustrating the condition of erroneous readings.

Assuming now that a dual transducer probe as shown in FIG. 1 is applied to a workpiece 12A, FIG. 2, which is considerably thinner, a defective thickness measurement is obtained. This is caused by the double reflection of the acoustic energy beam within the workpiece 12A. As seen quite clearly in FIG. 2, the search beam from the transducer 18 traverses the coupling means 22, is transmitted through the couplant 17 and enters the workpiece 12A through the entrant surface 14A. As the beam encounters the rear surface 16A of the workpiece a first reflection is obtained. The beam is reflected toward the entrant surface 14A, is reflected once again toward the rear surface 16A, and is reflected at the rear surface and finally reaches through the couplant film 17 and coupling means 24 the receiver transducer 20. As illustrated in FIG. 2, on account of the additional reflections within the workpiece, the indicated thickness of the workpiece, measuring the travel time of the ultrasonic energy within the workpiece, would be twice the actual thickness. This, of course, is erroneous and must be avoided if reliable and satisfactory thickness measurements are to be made. This condition is particularly hazardous when an ultrasonic thickness gauge of this type is used for measuring thin wall thicknesses of plates and tubings. Depending on the particular transducer and workpiece, erroneous measurements indicating two times or three times the actual thickness of the workpiece can be obtained.

An analysis of the characteristic of the correct echo signal and comparing it with the erroneous signal, that is one which is caused by a double or triple reflection of the ultrasonic energy within the workpiece, has revealed that electronic circuit means may be provided to reject erroneous readings. The additiontal reflections of the ultrasonic energy, as seen in FIG. 2, causes a scattering of the energy and the signal ultimately received by the receive transducer 20 is of a much lower signal amplitude than an echo signal which is the result of but a single reflection at the rear surface 16 or 16A of the workpiece. Thus, by providing a signal amplitude responsive electrical circuit in the receiver portion of the pulse-echo receiving circuit, it is possible to distinguish between readings which are acceptable and those which are based on an erroneous transit time and, therefore, should be rejected. This error prevention circuit feature is shown more clearly in FIGS. 3 and 4 hereafter.

Figure 3:
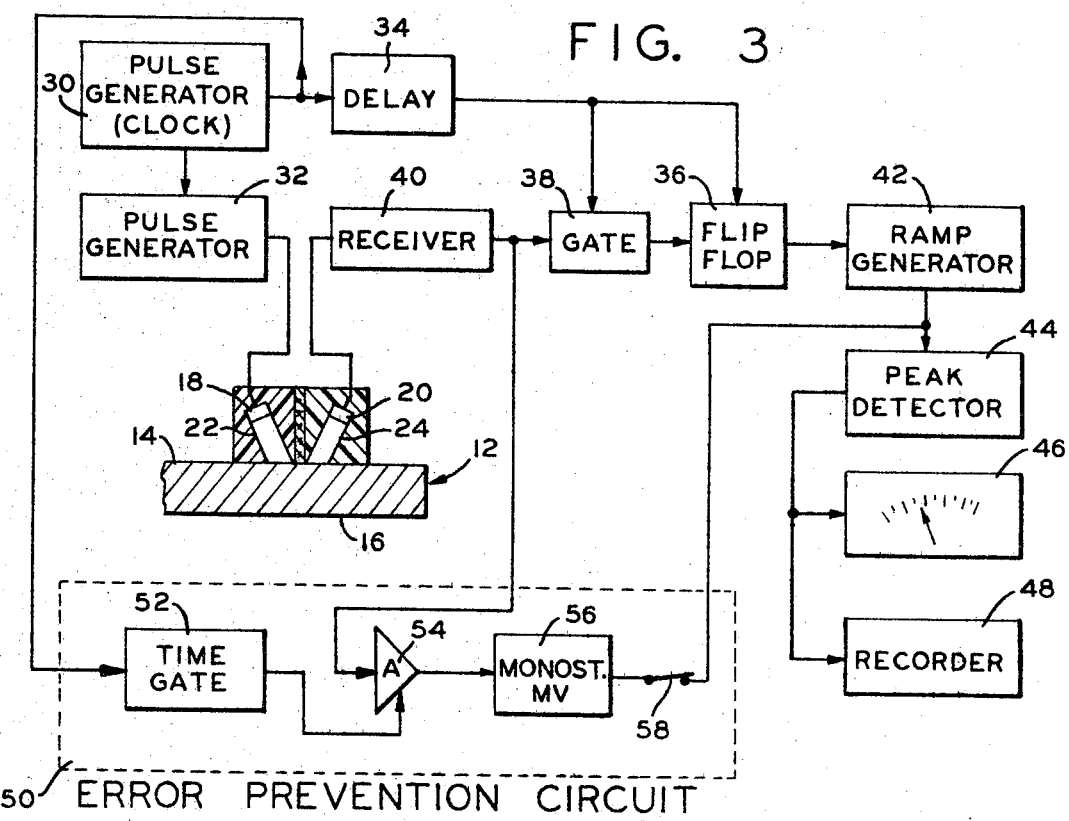
FIG. 3 is a schematic electrical circuit diagram of a pulse-echo ultrasonic thickness gauge with the error prevention circuit incorporated.

Referring now to FIG. 3, an ultrasonic thickness gauge apparatus is shown as described in U.S. Pat. No. 3,427,- 866 dated Feb. 18, 1969, issued to Frederick G. Weighart entitled, "Ultrasonic Thickness Gauge and Flow Detector." The basic apparatus remains the same as is shown in the patent, but an error prevention circuit 50 has been added. The operation of the thickness gauge, while described in complete detail in the patent, is repeated here just briefly in order to clarify the operation of the error prevention circuit.

A pulse generator 30, also known as clock or synchronizer, periodically causes the pulse generator 32 to generate a high-frequency pulse of ultrasonic frequency which is applied to the transducer 18 where the applied signal is converted to an acoustic signal, the ultrasonic search signal. The search signal is transmitted from the transducer 18 through the coupling means 22 and the entrant surface 14 into the workpiece 12. As the search signal intercepts the rear surface 16 of the workpiece, a reflection of the ultrasonic energy is caused and such energy is reflected back through the workpiece 12 and the coupling means 24 to the receive transducer 20. The received acoustic signal is transformed to an electrical signal and is received by the receiver amplifier 40. The pulse generator 30 when providing the initial synchronizing pulse is connected also to a delay circuit 34 and this circuit produces a delay which approximately equals the transit time of the search signal from the transmit transducer 18 through the coupling means 22 to the interface surface between the coupling means 22 and the entrant surface 14. The delayed pulse from the delay circuit 34 is applied to a gate 38 for opening the gate and also to a flip-flop or multivibrator 36 for starting a timing circuit.

Upon receipt of the echo signal by the receiver circuit 40, the signal is amplified, passed through the gate circuit 38, closing the gate circuit, and passed to the flip-flop timing circuit 36 to stop operation of the timing circuit. The ramp generator 42 connected to the multivibrator 36 generates a ramp voltage proportional to the time during which the flip-flop 36 is in its ON condition, that is, from the receipt of the delayed pulse signal from the delay circuit 34 to the receipt of the echo responsive signal from the receiver circuit 40. A peak detector circuit 44 provides a signal commensurate with the peak voltage generated by the ramp generator 42 and such peak voltage is displayed on a meter 46 and, if desired, recorded by a recorder 48. Thus, the meter 46 indicates a value commensurate with the transit time of the acoustic signal through the workpiece 12, that is, a value indicative of the thickness of the workpiece from the entrant surface 14 to the rear surface 16.

In order to prevent erroneous indications on the meter 46 as caused by multiple reflections of the acoustic energy within the workpiece 12, an error prevention circuit 50 is shown. Concurrently with the operation of the pulse generator 30, a time gate circuit 52 receives a signal from the generator 30 and this time gate is a circuit, such as a monostable multivibrator, for providing a time window for signals occurring within an initial period, such as echo responsive signals corresponding to a workpiece thickness from 0.010 to 0.300 inch. As is apparent from the previous discussion in connection with FIG. 2, errors are caused by comparatively thin walled workpieces. The time gate signal is applied as one input to a gated amplifier 54, which is essentially a gate. The output from the receiver circuit 40 serves as the other input to the gated amplifier 54 and, if the output from the receiver circuit 40 is in excess of a predetermined amplitude, a signal is transmitted from the gated amplifier to a monostable multivibrator 56 and applied through a closed circuit switch 58 to the connection between the ramp generator 42 and the peak detector circuit 44. With the monostable multivibrator 56 operated or triggered, the ramp generator 42 delivers the generated voltage to the peak detector 44. Assuming that the amplitude of the echo responsive signal from the receiver 40 failed to exceed a predetermined level, the signal at the receive transducer having been weakened on account of multiple reflections within the workpiece 12, the amplitude sensitive gated amplifier 54 will provide no output signal and the monostable multivibrator will not be operated. In its nonoperated condition the monostable multivibrator 56 is connected to ground and the signal from the ramp generator to the peak detector circuit is leaked to ground via the closed switch 58 and the multivibrator 56. Therefore, no voltage is accumulated at the peak detector 44 and the meter 46 fails to provide a thickness reading. Hence, the error prevention circuit is truly a "fail-safe" circuit, precluding an indication of thickness when an erroneous reading might occur. The error prevention circuit 50 can be removed from the measuring circuit by opening the switch 58 as will be described later.

The time gate 52 is necessary in view of the fact that when the workpiece thickness increases, the consequent attenuation and spread of the acoustic search beam causes an increasingly weaker echo signal to be received by the transducer 20. Therefore, the time gate 52 must be restricted to provide a window for only an initial workpiece thickness, typically a range from zero to 0.300 inch. In order to exclude the initial spurious signals, a typical gate adjustment is a window for signals corresponding to 0.010 to 0.300 inch thickness.

FIG. 4 shows the same error prevention circuit 50 incorporated in a thickness measuring circuit as described in copending application for U.S. Letters Patent Ser. No. 532,037 filed Jan. 27, 1966, in the name of Kilian H. Brech entitled "Ultrasonic Inspection Apparatus," now U.S. Pat. No. 3,485,087 issued Dec. 23, 1969. Neglecting for the moment the error prevention circuit 50, an electrical pulse generator 102 periodically provides a pulse signal to the electro-acoustic transducer 18 which causes an acoustic signal to be transmitted through the coupling means 22 into the workpiece 12. The rear surface of the workpiece 12 causes a reflection signal which is sensed as an echo signal by the electro-acoustic receive transducer 20.

When the search signal encounters the interface between the coupling means 22 and the entrant surface of the workpiece 12, a reflection, of first echo signal, is generated which is transmitted back to the transducer 18, is received by the amplifier 106 and transmitted to the bistable multivibrator 104 to start operation of the timing circuit. The second echo responsive signal, caused by the rear surface of the workpiece 12 and received by the transducer 20 is transmitted via the amplifier 108 to the multivibrator 104 for terminating the operation of the timing multivibrator. The multivibrator, therefore, provides a time interval commensurate with the receipt of a first echo signal by the transducer 18, this echo arising from the interface between the coupling means 22 and the workpiece 12, and the receipt of a second echo received by the transducer 20 and arising from the search signal encountering the rear surface of the workpiece 12. The multivibrator 104 while in its timing condition establishes a constant current flow from the B+ terminal through the transistor 110 and the transistor 112 to ground, causing the capacitor 114 to be charged and assume a potential commensurate with the length of operation of the timing multivibrator 104. The transistor 110, transistor 112 together with the capacitor 114 form essentially a ramp generator 42 as indicated in FIG. 3. A materials calibration capacitor 116 is connected in parallel with the capacitor 114 in order to provide a calibration for the difference in the velocity of sound exhibited by materials which form the workpiece 12. A diode rectifier 118 and a capacitor 120 form the peak detector circuit, and the peak voltage existing across the capacitor 114, rectified as a direct current potential, is applied to a meter 122 via an impedance isolation transistor 124.

In order to preclude operation of the timing multivibrator concurrently with the generation of the search signals, i.e., prior to the receipt of the first echo signal, an inhibit signal is provided from the pulse generator 102 to the multivibrator 104.

The error prevention circuit 50 is connected so that the time gate 52 is actuated responsive to the operation of the pulse generator 102 and operation of the transducer 18. The gated amplifier 54 receives one input from the time gate circuit 52 and receives its second input from the amplifier 108 which provides an electrical signal whose amplitude is responsive to the echo caused within the workpiece. If this echo responsive signal exceeds a predetermined amplitude, the monostable multivibrator 56 is actuated and the capacitor 120 remains charged. However, if the monostable multivibrator 56 is not operated on account of the echo responsive signal being of insufficient amplitude and if the switch 58 is closed, the monostable multivibrator, being connected to ground, causes the charge across the capacitor 120 to be leaked off to ground and, therefore, no output is available at the meter 122.

FIG. 5 shows a conventional monostable multivibrator as found for instance in the book "Electronic Circuit Analysis," published by the Department of the Air Force, A.F. Manual 52–8, volume 1, dated Nov. 1, 1962, pages 8–51. The monostable multivibrator has a set of input terminals 202 and a set of output terminals 204, and a first transistor 206 and a second transistor 208 together with associated other circuit elements and connections, not specifically identified herein in view of the fact that the monostable multivibrator is a well known and understood device. With no input applied at the terminals 202 the transistor 208 is conductive, as shown by the hatched lines, and a circuit is established from the upper output terminal 204 through the emitter and collector electrodes of the transistor 208 to ground. This represents the nonoperated condition in which the charging capacitor 120 (FIG. 4) is shorted to ground. When a signal is received at the terminals 202, the transistor 206 is rendered conductive and the conduction of current through the transistor 208 is stopped, thus lifting the connection from ground. The switch 58 is provided in order to insert or remove the error prevention circuit 50 from the normal measuring circuit. This switch is moved into the open circuit condition when performing thickness measurements on heavy sections where the recurring reflection of ultrasonic energy within the workpiece does not occur and the amplitude of the echo responsive signals decreases by virtue of beam spread or scattering of energy at corroded surfaces. In a typical embodiment where measurements up to 3 inch thickness can be carried out, the error prevention circuit 50 is connected for measurements up to 0.300 inch and then is removed from the circuit by opening the switch 58.

In another mode of operation, when testing comparatively thin workpieces, the switch 58 is normally in its open position and then momentarily closed. If the reading on the output meter remains, the thickness reading is a valid one. If the reading disappears, the previous reading is defective, being based on multiple reflection of ultrasonic energy.

It will be apparent from the description above that the error prevention circuit disclosed herein constitutes an important feature in ultrasonic pulse-echo testing where the output is indicated on a meter which does not permit for an analysis of the characteristic of the echo signal. The error prevention circuit forestalls an indication of wrong wall thicknesses, specifically indicating a wall thickness which is heavier than that actually existing. Thus, wrong reading at the low thickness level using a transducer probe constructed for heavier wall thickness can be avoided.

What is claimed is:

1. A pulse-echo ultrasonic apparatus for exploring an object comprising:

a transducer probe comprising a first and a second electroacoustic transducer disposed substantially in juxtaposition;

first and second acoustic coupling means associated respectively with said first and second transducers for acoustically coupling each of said transducers through a respective coupling means and a couplant film to the entrant surface of an object to be explored;

acoustic shielding means disposed between said first and second coupling means for suppressing cross-coupling of acoustic signals traversing said respective coupling means;

an electrical pulse generator coupled to said first transducer for periodically energizing said first transducer whereby said transducer is caused periodically to transmit an ultrasonic search pulse through said first coupling means into the object;

electrical timing means coupled to said pulse generator and said second transducer for starting a timing cycle responsive to the generation of a signal by said first transducer and to terminate said respective timing cycle responsive to the generation of a subsequent electrical signal by said second transducer, said subsequent signal being caused by a reflection of ultrasonic energy arising as the ultrasonic search pulse intercepts an acoustic discontinuity below the entrant surface of the object;

a read-out circuit coupled to said timing means for providing a display commensurate with the duration of said timing cycle;

time gate means coupled to be responsive to the operation of said pulse generator for providing a time interval during which a signal is permitted to pass subsequent to the energizing of said first transducer;

further gate means coupled to said time gate means and to said second transducer and providing an output signal responsive to said subsequent electrical signal caused by an acoustic discontinuity below the entrant surface of the object exceeding a predetermined amplitude and being received by said second transducer during the time interval provided by said time gate means, and means coupled for receiving said output signal and coupled to said read-out circuit for causing said read-out circuit to provide a display commensurate with the duration of said timing cycle responsive to the presence of said output signal from said further gate means and inhibit a display in the. absence of said output signal.

2. A pulse-echo ultrasonic apparatus as set forth in claim 1, said time gate means being adjusted to correspond to the transit time of the ultrasonic search pulse and acoustic discontinuity responsive signal commensurate with an initial thickness range of the object under test.

3. A pulse-echo ultrasonic apparatus as set forth in claim 1, and including switching means coupled for selectively precluding said time gate means and further gate means from affecting the operation of said read-out circuit.

4. A pulse-echo ultrasonic apparatus as set forth in claim 1, said further gate means comprising a gated amplifier.

5. A pulse-echo ultrasonic apparatus as set forth in claim 4, said means for receiving said output signal comprising a monostable multivibrator.

6. A pulse-echo ultrasonic apparatus as set forth in claim 1, said first transducer and second transducer in combination with said respective coupling means being angularly disposed to exhibit ultrasonic energy beam axes which intersect each other adjacent the rear surface of the object to be explored.

7. A pulse-echo ultrasonic apparatus for exploring an object comprising:

a transducer probe comprising a first and a second electroacoustic transducer disposed substantially in juxtaposition;

first and second acoustic coupling means associated respectively with said first and second transducers for acoustically coupling each of said transducers through a respective coupling means and a couplant film to the entrant surface of an object to be explored;

acoustic shielding means disposed between said first and second coupling means for suppressing cross-coupling of acoustic signals traversing said respective coupling means;

an electrical pulse generator coupled to said first transducer for periodically energizing said first transducer whereby said transducer is caused periodically to transmit an ultrasonic search pulse through said first coupling means into the object;

electrical timing means coupled to said first and said second transducer for starting a timing cycle responsive to the generation of an electrical signal by said first transducer, said signal being caused by a reflection of ultrasonic energy of the search pulse substantially at the interface between said coupling means and the entrant surface of the object, and to terminate said respective timing cycle responsive to the generation of a subsequent electrical signal by said second transducer, said subsequent signal being caused by a reflection of ultrasonic energy arising as the ultrasonic search pulse intercepts an acoustic discontinuity below the entrant surface;

a read-out circuit coupled to said timing means for providing a display commensurate with the duration of said timing cycle;

means coupled between said pulse generator and said timing means for inhibiting operation of said timing means when said pulse generator energizes said first transducer;

time gate means coupled to be responsive to the operation of said pulse generator for providing a time interval during which a signal is permitted to pass subsequent to the energizing of said first transducer;

further gate means coupled to said time gate means and to said second transducer and providing an output signal responsive to said subsequent electrical signal caused by an acoustic discontinuity below the entrant surface of the object exceeding a predetermined amplitude and being received by said second transducer during the time interval provided by said time gate means, and means coupled for receiving said output signal and coupled to said read-out circuit for causing said read-out circuit to provide a display commensurate with the duration of said timing cycle responsive to the presence of said output signal from said further gate means and inhibit a display in the absence of said output signal.

8. A pulse-echo ultrasonic apparatus as set forth in claim 7, said time gate means being adjusted to correspond to the transit time of the ultrasonic search signal and said acoustic discontinuity responsive signal commensurate with an initial thickness range of an object under test.

9. A pulse-echo ultrasonic apparatus as set forth in claim 7, and including switching means coupled for precluding said time gate means and further gate means from affecting operation of said read-out circuit.

10. A pulse-echo ultrasonic apparatus as set forth in claim 7, said time gate means being a monostable multivibrator, said further gate means being a gated amplifier, and said means for receiving said output signal being a monostable multivibrator.

11. A pulse-echo ultrasonic apparatus as set forth in claim 7, said first transducer and second transducer in combination with said respective coupling means being angularly disposed to have ultrasonic energy beam axes which intersect each other adjacent the rear surface of the object to be explored.

12. A pulse-echo ultrasonic apparatus for exploring an object comprising:

a transducer probe comprising a first and a second electroacoustic transducer disposed substantially in juxtaposition;

first and second acoustic coupling means associated respectively with said first and second transducers for acoustically coupling each of said transducers through a respective coupling means and a couplant film to the entrant surface of a object to be explored;

acoustic shielding means disposed between said first and second coupling means for suppressing cross-coupling of acoustic signals tranversing said respective coupling means;

an electrical pulse generator coupled to said first transducer for periodically enegizing said first transducer whereby said transducer is caused periodically to transmit an ultrasonic search pulse through said first coupling means into the object;

electrical timing means coupled to said pulse generator and said second transducer for starting a timing cycle responsive to the generation of a signal by said first transducer and to terminate said respective timing cycle responsive to the generation of a subsequent electrical signal by said second transducer, said subsequent signal being caused by a reflection of ultrasonic energy arising as the utrasonic search pulse intercepts an acoustic discontinuity below the entrant surface of the object;

a read-out circuit coupled to said timing means for providing a display commensurate with the duration of said timing cycle;

amplitude sensitive means coupled for receiving a signal responsive to said subsequent signal and determining whether said subsequent signal exceeds a predetermined amplitude, and means coupling said amplitude sensitive means to said readout circuit to provide a display commensurate with the duration of said timing cycle responsive to said subsequent signal exceeding a predetermined amplitude and inhibit a display when said subsequent signal fails to exceed the predetermined amplitude.

13. A pulse-echo ultrasonic apparatus as set forth in claim 12, and including time gate means responsive to the energizing of said first transducer coupled to said amplitude sensitive means for causing said amplitude sensitive means to be effective only during a predtermined time interval.

14. A pulse-echo ultrasonic apparatus for exploring an object comprising:

a transducer probe comprising a first and a second electroacoustic transducer disposed substantially in juxtaposition;

first and second acoustic coupling means associated respectively with said first and second transducers for acoustically coupling each of said transducers through a respective coupling means and a couplant film to the entrant surface of an object to be explored;

acoustic shielding means disposed between said first and second coupling means for suppressing cross-coupling of acoustic signals transversing said respective coupling means;

an electrical pulse generator coupled to said first transducer for periodically energizing said first transducer whereby said transducer is caused periodically to transmit an ultrasonic search pulse through said first coupling means into the object;

electrical timing means coupled to said pulse generator and said second transducer for starting a timing cycle responsive to the generation of a signal by said first transducer and to terminate said respective timing cycle responsive to the generation of a subsequent electrical signal by said second transducer, said subsequent signal being caused by a reflection of ultrasonic energy arising as the utrasonic search pulse intercepts an acoustic discontinuity below the entrant surface of the object;

a read-out circuit coupled to said timing means for providing a display commensurate with the duration of said timing cycle;

time gate means coupled to be responsive to the energizing of said first transducer for providing a time interval during which a signal is permitted to pass subsequent to the energizing of said first transducer;

further means coupled to said time gate means and to said second transducer and assuming a first condition responsive to said subsequent electrical signal caused by an acoustic discontinuity below the entrant surface of the object exceeding a predetermined amplitude and being received by said second transducer during the time interval provided by said time gate means, and said further means being in a second condition in the absence of said first condition, and means coupled to said further means and to said read-out circuit for causing said read-out circuit to provide a display commensurate with the duration of said timing cycle responsive to said further means assuming said first condition and to inhibit a display responsive to said further means being in said second condition.

15. A pulse-echo ultrasonic apparatus as set forth in claim 14, and including switching means coupled for selectively precluding said time gate means and further means from affecting said read-out circuit.

References Cited

UNITED STATES PATENTS

| | | | |
|---|---|---|---|
| 3,427,866 | 2/1969 | Weighart | 73—67.7 |
| 3,485,087 | 12/1969 | Brech | 73—67.7 |

JAMES J. GILL, Primary Examiner